United States Patent

Fritz

[11] 3,713,283
[45] Jan. 30, 1973

[54] TINE GUIDING DEVICE FOR CROP PICK-UP

[75] Inventor: Edward A. Fritz, Hinsdale, Ill.
[73] Assignee: International Harvester Company, Chicago, Ill.
[22] Filed: Feb. 9, 1972
[21] Appl. No.: 224,818

[52] U.S. Cl. .................................................56/364
[51] Int. Cl. ...........................................A01d 89/00
[58] Field of Search...............................56/364, 345

[56] References Cited

UNITED STATES PATENTS

| | | | |
|---|---|---|---|
| 1,114,416 | 10/1914 | Tingley et al. | 56/364 |
| 3,397,527 | 8/1968 | Luck et al. | 56/364 |
| 3,613,345 | 10/1971 | Cofer | 56/364 |
| 2,732,678 | 1/1956 | Blaser et al. | 56/364 |
| 2,256,829 | 9/1941 | Hyman | 56/364 |
| 2,527,887 | 10/1950 | Martin | 56/364 |

FOREIGN PATENTS OR APPLICATIONS 895,797   5/1962   Great Britain...........................56/364

Primary Examiner—Russell R. Kinsey
Attorney—Floyd B. Harman

[57] ABSTRACT

In a crop pick-up having spaced stripper bars forming a plurality of channels through which pick-up tines extend to gather the crops, a device is located for shifting a deflected tine from an adjacent channel into its proper channel.

5 Claims, 8 Drawing Figures

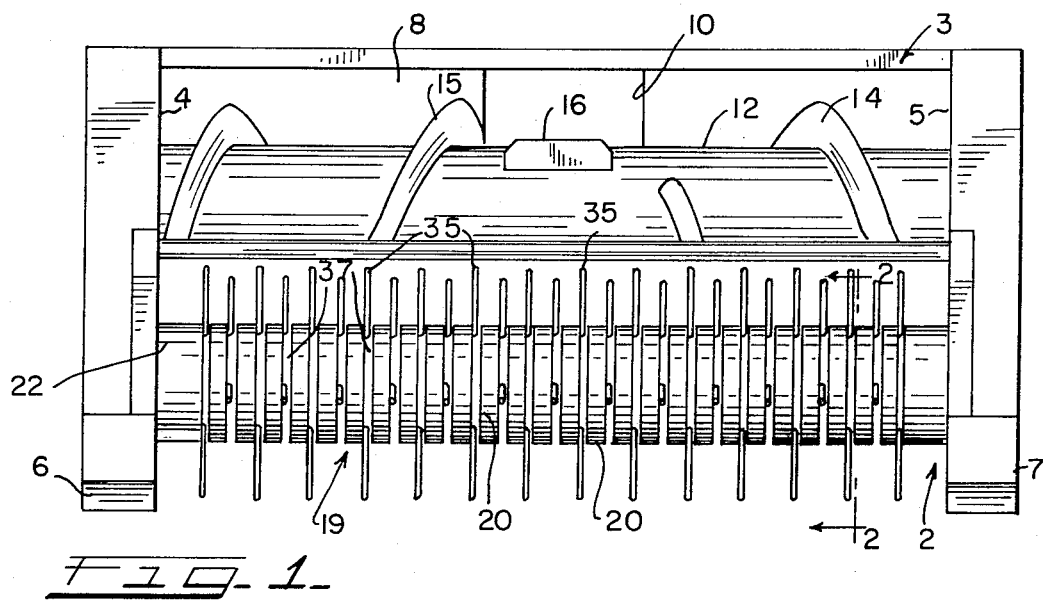
Fig. 1.
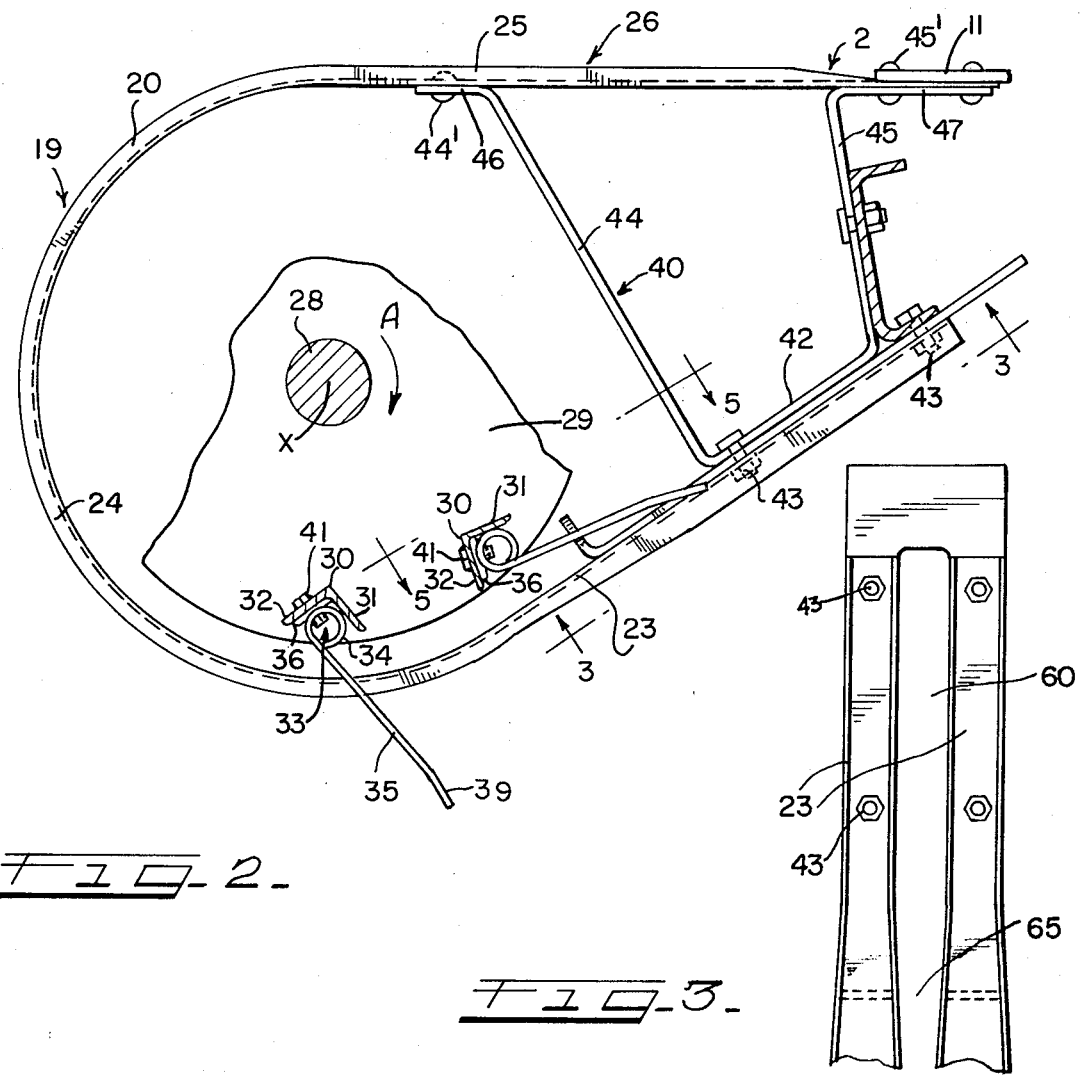
Fig. 2.
Fig. 3.

TINE GUIDING DEVICE FOR CROP PICK-UP

DISCUSSION OF THE ART

Pick-up devices of the type under consideration comprise a pick-up drum revolving about a horizontal axis and comprising a plurality of outstanding spring-mounted or flexible tines. The tines track in slots formed between laterally spaced stripper bars which are wrapped about the drum and form a crop-supporting deck above the drum. The tines project in front of the housing formed by the stripper formations and sweep from underneath the same into engagement with crops in front of the unit. Frequently, the tines encounter mounds of dirt, rocks projecting or lying in the field and other obstructions. The tine is flexible and frequently is sprung and deflects into the housing formed by the stripper bars and is forced sidewise into the slot laterally adjacent to the slot in which it is intended to operate. This may simultaneously or sporadically occur with several tines such that the operational capabilities of the unit are reduced and if the misaligned tracking is continued, even for a short time, causes strippers to wear and tines to wear and break off. No correcting or realigning devices are presently available, as far as is known to applicant, for forcing such a displaced tine into its proper track.

SUMMARY OF THE INVENTION

This invention is directed to a novel means for displacing a tine from an improper track into which it had been forced into its proper track.

The invention contemplates the provision of a novel camming means on the strippers forming the drum enclosure and positioning these camming means in the region of the return sweep of the tines in the path of movement of the displaced tines and operative to cam these tines out of the improper tracks so that their inherent self-righting resiliency will cause them, with the assist of the camming means, to return to their proper tracks.

A further object is to provide a novel camming assembly of simple and effective form which will not interfere with the normal operation of the pick-up unit.

These and other objects and advantages inherent in and encompassed by the invention will become more apparent from the specification and the drawings, wherein:

FIG. 1 is a front elevational view of a conventional harvester pick-up device incorporating the invention;

FIG. 2 is an enlarged cross-sectional view taken substantially on line 2—2 of FIG. 1;

FIG. 3 is a fragmentary bottom view of the pick-up housing taken generally on line 3—3 of FIG. 2;

DESCRIPTION OF THE INVENTION FIGS. 1-6

Figure 4:
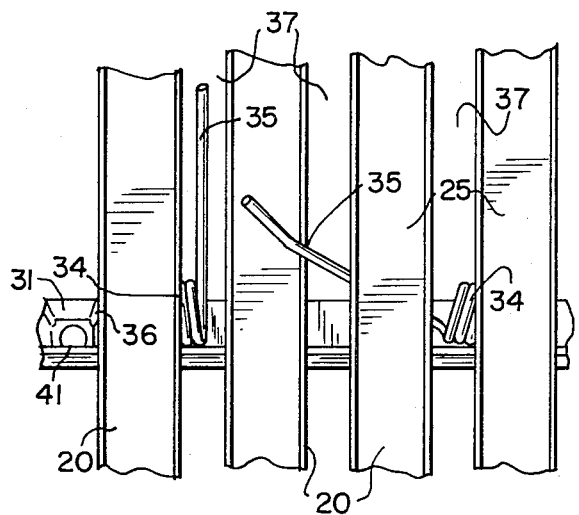
FIG. 4 is an enlarged fragmentary view of a portion of the stripper assembly and drum showing a crossed tine.

The invention is disclosed in association with a pick-up device generally designated 2 of a conventional forage harvester. The pick-up device is located at the front of a platform structure 3 having upright side walls 4 and 5 with ground runners 6 and 7. A rear wall structure 8 interconnects the side walls 4 and 5 and has a central crop discharge opening 10. The walls 4, 5 and 8 are connected to the ends and rear edge respectively of a solid bottom wall or deck 11 fragmentarily shown in FIG. 2.

An auger conveyor 12 is positioned over the solid deck 11 and with its flights 14 and 15, operates to move the crops centrally to a paddle 16 fixed on the auger core 17 for discharge of the crop material into the discharge opening 10 whereat the material is conveyed to associated processing mechanism such as a chopper, for example, as well known to those skilled in the art.

The pick-up 2 is disposed ahead of the auger in feeding relation thereto and comprises a material support structure, housing or enclosure 19 in the form of a plurality of stripper bars 20 which are wrapped about a conveyor head or pick-up drum 22. Each stripper has a lower portion 23 which angles downwardly and forwardly from the deck chordally with respect to the axis X (FIG. 2) of rotation of the drum 22 and merges at its lower forward end into the lower end of an arcuate front portion 24 which is curved concentric with respect to the axis X. The upper end of the portion 24 is directed rearwardly and merges into the front end of a straight upper or top portion 25. The portions 25 which are generally horizontal and form a deck extension generally designated 26.

The drum comprises a center shaft 28 suitably mounted from the side walls 4 and 5 and driven in the direction of the arrows A in FIG. 2 by any well known means. The shaft 28 is connected to a plurality of axially spaced annular supporting disks or plates 29, which are peripherally pivotally connected to axially extending support bars 30 which are in the form of angle irons having their flanges 31, 32 diverging outwardly and forming a pocket 33 therebetween which admits the root end spring portions 34 of tines 35.

The tines 35 are made of spring steel and the spring portions 34 are helical springs which lay within the pockets 33 and extend axially of the drum. The springs 34 are connected at one of their ends to the tine fingers 35 which project outwardly from the drum through the respective slots or channels 37 which are defined by the strippers. Each finger 35 has an end portion 39 which is angled in a leading direction to increase the aggressiveness of the tine. The spring portions 34 are interconnected by a tie bar 36 which is secured by a bolt and nut assembly 41 to the flange 32.

Each stripper is reinforced by a U-shaped brace or bracket 40 which has a base portion 42. Sections 23 are secured by bolts 43 to the lower section 40 of the respective braces. Legs 44, 45 of each brace 40 have flanges 46, 47 which attach at spaced points as at 44' and 45' to the respective upper section.

Figure 5:
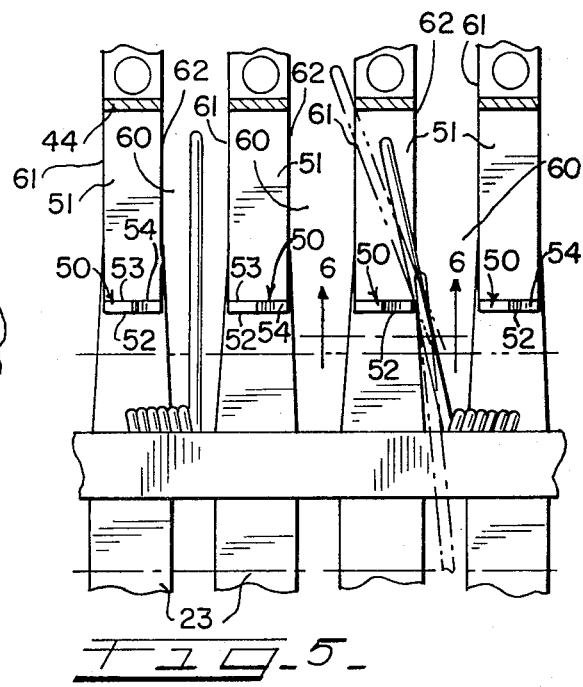
FIG. 5 is a sectional view taken substantially on line 5—5 of FIG. 2.
Figure 6:
FIG. 6 is an enlarged cross-sectional view taken substantially on line 6—6 of FIG. 5.
Figure 8:
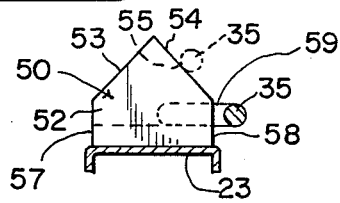
FIG. 8 is an enlarged view taken substantially on line 8—8 of FIG. 7.
Figure 8:
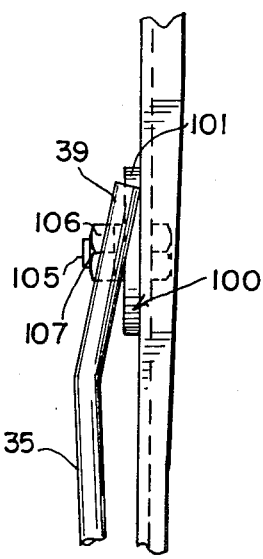

One of the principal features of the invention is in the provision of realigning or cam means 50 on each stripper bar. Each cam means comprise a leg or prong 51 secured to the bottom section of the respective stripper. The legs 51 are connected to or are integral with the base portion of a flat sheet of material as shown in FIGS. 2 and 3. Each cam means comprises an upstanding leg 52 with upwardly converging cam or fulcrum surfaces 53, 54 which are adapted to engage a crossed tine intermediate its ends as at 55 as seen in FIGS. 5 and 6 so that the tine may slide downwardly to the contiguous cam side edge surface 57 or 58 where the tine is fulcrumed at 59 and deflected from a crossed-over position as shown in FIGS. 2, 4 and 6 to a normal operating position of FIG. 1. It will be observed that the camming action takes place during the return position of the orbit of the tine in a location where the tine is not in the crop and wherein the strippers are of reduced width as at 60 and the side edges 61, 62 of the stripper portions 23 diverge rearwardly from the normal slot width. This promotes tine deflection laterally as best seen in FIG. 5 and permits the tine to be cammed into the appropriate slot or track 37.

DESCRIPTION OF FIGS. 7 AND 8

Figure 7:
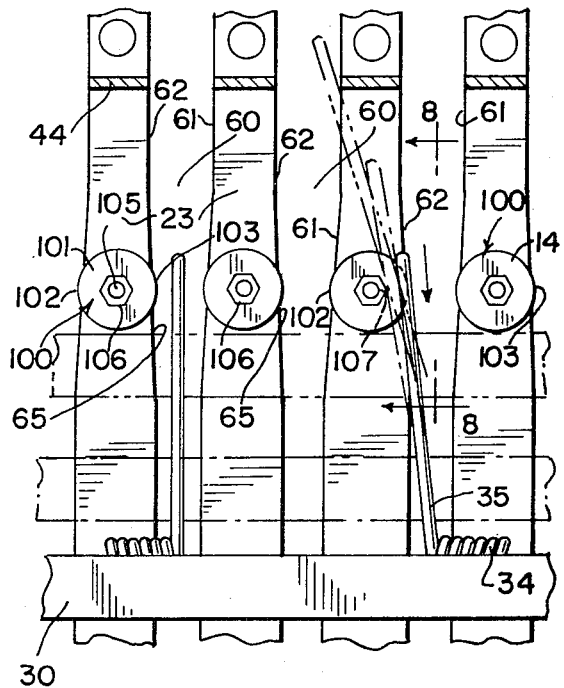
FIG. 7 is a view comparable to FIG. 5 showing a modified form of the invention.

In this embodiment, parts similar to that previously shown are identified by the same reference numerals. In this embodiment, each cam 100 consists of a round washer 101 which peripherally projects at 102, 103 into the adjacent slots in the area of their convergence at 65. The position of the cam is the same as in the previous embodiment and in addition to the circular member 100, comprises a bolt and nut assembly 105, 106, the assembly adapted to intercept the crossed-over shank and to fulcrum it as at 107 (FIG. 7) into the appropriate slot.

It will be realized that in each embodiment the tines and their mounting bars are cammed and cause the tines to withdraw at the rear of the deck into the housing and after entering the housing the fingers trail the respective mounting bar and then are cammed in the lower segment of their orbit to project through the lower sections 23 so that they continue to trail as seen in FIG. 2 and then pitch upwardly on the forward side as well known.

Having described several preferred modifications of the invention which are intended to disclose the best mode of applying the inventions, it will be understood that such disclosures are only by way of illustration and not limitations and the scope hereof is intended to be limited as set forth in the appended claims.

What is claimed is:

1. In a crop pick-up for a harvester having a frame, said crop pick-up comprising a drum supported by said frame and rotatable about a generally horizontal axis and having outstanding tines arranged in axially spaced rows, an enclosure supported on said frame for the drum and comprising laterally spaced stripper bars wrapped about the drum and forming channels therebetween, said channels aligned with said axially spaced rows of tines such that said tines extend through said channels, said tines being flexible and capable of being deflected from their respective channels into adjacent channels, and means cooperative with the deflected tines for realigning the deflected tines into the appropriate respective channels attendant to rotation of the drum, said means for realigning the deflected tines comprising a flat sheet of material having a base portion, a plurality of spaced prongs extending from said base portion and terminating in angularly disposed free ends, means securing said flat sheet of material and said spaced prongs to said stripper bars and to said frame to thus stabilize and connect adjacent stripper bars, said realigning means comprising cams formed on said free ends having cam surfaces adjacent respective channels.

2. The invention according to claim 1 and said stripper bars having lower sections extending beneath the drum, and said cams located on said lower sections and means for rotating the drum in a direction moving the drum forwardly along said lower sections and said displaced tines in trailing relation to their area of connection with the drum.

3 The invention according to claim 1 and said realigning means located beneath the drum and operative in a segment of the orbit of the tines when said tines are not in engagement with the crop material.

4. The invention according to claim 1 and said tines having coil spring root ends accommodating universal angling movements of the respective tines and said strippers having bottom segments beneath the drum extending generally tangentially to the path of rotation of the drum, and said realigning means comprising cam elements located on said bottom segments adjacent to the periphery of the drum in the path of said deflected tines.

5. The invention according to claim 1 and said realigning means comprising cams located in an area of said enclosure remote from the crop-engaging areas thereof and said channel being of limited widened dimension upstream of said cams to accommodate deflection of the deflected tines as they engage the respective cams.

* * * * *